United States Patent [19]

Iacovangelo et al.

[11] 4,404,267
[45] Sep. 13, 1983

[54] ANODE COMPOSITE FOR MOLTEN CARBONATE FUEL CELL

[75] Inventors: Charles D. Iacovangelo, Schenectady; Kenneth P. Zarnoch, Clifton Park, both of N.Y.

[73] Assignee: General Electric Company, Schenectady, N.Y.

[21] Appl. No.: 371,879

[22] Filed: Apr. 26, 1982

[51] Int. Cl.³ .............................................. H01M 4/86
[52] U.S. Cl. ...................................... 429/41; 429/45; 427/115
[58] Field of Search ............................ 429/45, 44, 41; 427/115

[56] References Cited

U.S. PATENT DOCUMENTS

4,187,350  2/1980  McIntyre et al. ...................... 429/45
4,206,271  6/1980  Norling et al. ........................ 429/45
4,251,344  2/1981  Needes ................................ 429/45 X Primary Examiner—Charles F. LeFevour
Attorney, Agent, or Firm—Jane M. Binkowski; James C. Davis, Jr.; James Magee, Jr.

[57] ABSTRACT

An anode composite useful for a molten carbonate fuel cell comprised of a porous sintered metallic anode component having a porous bubble pressure barrier integrally sintered to one face thereof, said barrier being comprised of metal coated ceramic particles sintered together and to said anode by means of said metal coating, said metal coating enveloping said ceramic particle and being selected from the group consisting of nickel, copper and alloys thereof, the median pore size of the barrier being significantly smaller than that of the anode.

4 Claims, 6 Drawing Figures

ANODE COMPOSITE FOR MOLTEN CARBONATE FUEL CELL

The Government of the United States of America has rights in this invention pursuant to Department of Energy Contract No. DE-AC-02-80ET17019.

The present invention relates to the production of an anode composite useful for a molten carbonate fuel cell comprised of a porous sintered metallic anode having a porous sintered bubble pressure barrier integrally sintered to one face thereof. The barrier is comprised of metal enveloped ceramic particles sintered together by the enveloping metal and has a median pore size significantly smaller than that of the anode.

The state of the art in molten carbonate fuel cell (MCFC) anodes is to use porous sintered Ni (10 wt.% Cr) electrodes. These structures are typically 60–75% porous, having average pore sizes of 4–6 microns. In an operating cell, these anodes are placed in contact with an $Li_2CO_3/K_2CO_3/LiAlO_2$ or $SrTiO_3$ composite which is referred to in the art as tile. The $LiAlO_2$ or $SrTiO_3$ particles form a matrix the interstices of which are filled with the carbonate melt. The average pore size in this matrix is 0.02–0.4 microns. Some of the pores in the anode during operation at 650° C. draw electrolyte ($Li_2CO_3/K_2CO_3$) from the tile providing a reaction zone for the hydrogen oxidation reaction:

$$H_2 + CO_3^- \rightarrow H_2O + CO_2 + 2e^-.$$

The gas feed to the cathode, which is on the opposite side of the tile, i.e. composite of electrolyte and supporting matrix, is a mixture of $O_2$ and $CO_2$. One of the pivotal problems encountered with operating cells occurs when the tile does not act as a sufficient bubble pressure barrier to the anode and cathode gases or its cracks. When this happens, the gases mix causing, as a minimum, a drop in the cell voltage and loss of electrochemically utilizing fuel, or in more severe cases, oxidation of the nickel anode, and a potential safety hazard. The present invention overcomes these problems by providing an anode which contains, as an integral part of its structure, a barrier to this gas cross leak problem.

In the present invention, a layer of metal- or metal alloy-plated ceramic powders is incorporated as an integral part of the anode. By controlling the type of metal or metal alloy which is plated onto the ceramic particle and controlling the amount and size of the ceramic particles, a wide range of pore sizes can be achieved. Since in the presence of an insufficient amount of electrolyte to completely fill all of the pores in the electrodes and electrolyte matrix, the electrolyte fills the smallest pores, one can control the location of the electrolyte and degree of protection by controlling the size of the pores in the bubble pressure barrier of the anode. By making the pores in this barrier layer small enough to ensure complete filling, the anode and cathode gases can mix only if a sufficient pressure drop exists across the cell to blow the electrolyte out of the pores. For example, if the median pore size, i.e. median pore diameter, of the pores in the barrier layer is approximately 1–3$\mu$, it would theoretically take a $\Delta P$ of ~39 psia without flaws, which is well below anticipated pressure drops in operating cells.

Since the pores in the barrier layer are smaller than the remaining electrode, they fill with electrolyte functioning as a barrier to cross leak without "flooding" the remaining active electrode area, i.e. the anode. In addition to serving as a cross leak barrier, this barrier layer also ensures integral contact of the anode to the tile and may allow operation with thinner tiles thus decreasing the cell resistance and increasing the power of the cell. Another feature of this invention is that since anodes are already made by sintering, the addition of this barrier layer should add very little to the processing cost and is amenable to low cost processing operations such as tape casting. Another advantage of this invention is that if portions of the barrier layer do not fill with electrolyte, or lose electrolyte with time, they will still contain the metal catalyst required to carry out the $H_2$ oxidation reaction, i.e. the metal coating enveloping the ceramic particles, and are, therefore, electrochemically active anode pores just like the anode.

Briefly stated, the present anode composite is comprised of a porous sintered anode composed of metal or metal-covered ceramic particles having a porous sintered bubble pressure barrier layer integrally sintered to one face thereof covering said face, said barrier layer being comprised of a plurality of metal coated ceramic particle enveloped by said metal coating sintered together and to said anode by means of said metal coating, said metal coating being selected from the group consisting of nickel, copper and alloys thereof, said ceramic particle being selected from the group consisting of lithium aluminate, strontium titanate, $\alpha$-alumina and mixtures thereof, said barrier layer having a pore volume greater than 40% by volume but less than 85% by volume of said barrier layer, the pores of said barrier layer having a median pore diameter significantly less than that of said anode.

Those skilled in the art will gain a further and better understanding of the present invention from the detailed description set forth below, considered in conjunction with the figure accompanying and forming a part of the specification, in which.

Figure 1:
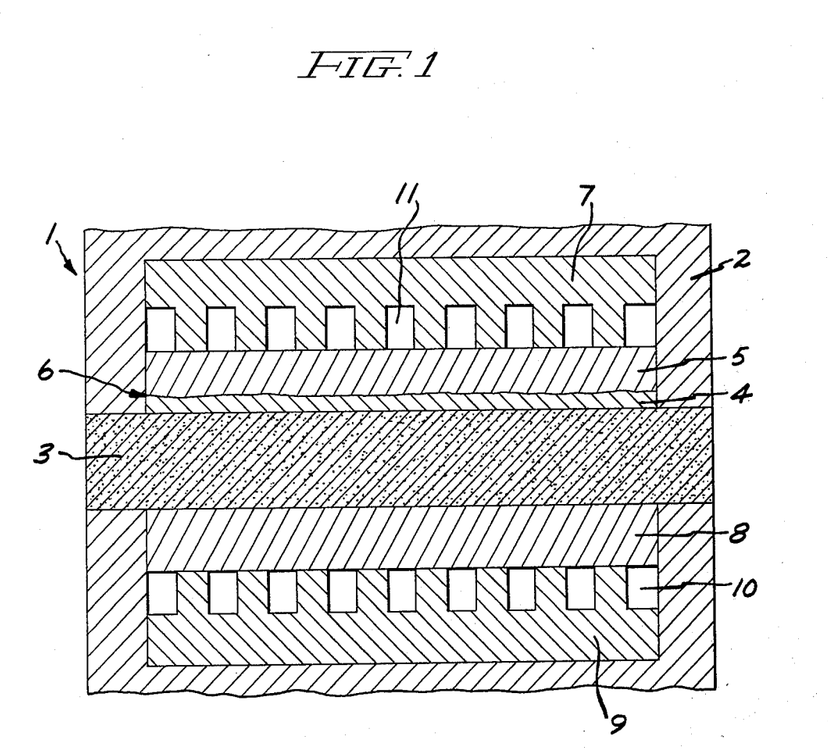
FIG. 1 shows in cross-section the cell hardware of one type of molten carbonate fuel cell with the present anode composite.

Specifically, FIG. 1 shows cell 1 with solid metal housing 2. One face of tile 3 is in contact with bubble pressure barrier 4 integrally sintered to anode 5. Barrier 4 and anode 5 comprise the present anode composite 6. Current collector plate 7 is associated with anode 5. Plate 7 is corrugated providing openings 11 for reactant gases for the hydrogen oxidation reaction. Cathode 8 contacts the opposite face of tile 3. Current collector plate 9 is associated with cathode 8. Plate 9 is corrugated providing openings 10 for reactant gases for the oxygen reduction reaction.

To provide the present bubble pressure barrier, ceramic powder is used which is non-sintering or substantially non-sintering at the operating temperatures of the molten carbonate fuel cell. By non-sintering it is meant that the ceramic particles do not bond or fuse directly to each other at the operating temperatures ranging from about 500° C. to about 900° C. Representative of the ceramic particles useful in the present invention are ceramic materials such as, for example, lithium aluminate, strontium titanate, α-alumina and mixtures thereof.

The size of the ceramic particles which are electroless plated depends largely on the thickness of the metal to be deposited thereon and also on the pore size desired in the bubble pressure barrier fabricated therefrom. The specific thickness of metal plated on the ceramic powder depends largely on the size of the ceramic powder. For example, for the same metal loading, there is produced an increasing metal thickness with increasing ceramic particle size. Generally, the amount of metal plated on the ceramic powder ranges from about 30 weight % to about 80 weight %, and preferably from about 50 weight % to about 70 weight %, of the total weight of the metal coated ceramic powder. Generally, the ceramic particle ranges in size from about 0.1 micron to about 1.0 micron, and preferably from about 0.1 micron to 0.5 micron. If desired, in one embodiment of the present invention, ceramic particles of plural or distributed size can be electroless plated to produce metal enveloped particles of plural or distributed size wherein the thickness of the enveloping metal is substantially the same. In another embodiment of the present invention, ceramic particles of substantially the same size can be electroless plated to deposit the enveloping metal in a range of thicknesses producing metal enveloped ceramic particles of plural or distributed size. Such ceramic powders of distributed or plurality size are useful for fabricating a bubble pressure barrier of distributed or plurality pore size since pore size of the present barrier is largely determined by the size of the metal-enveloped ceramic particles.

Since the starting particles are ceramic, their surfaces must first be treated with a catalyst to initiate electroless deposition. Preferably, their surfaces are catalyzed by the reaction product of stannous chloride and palladium chloride or silver nitrate. Such catalysis is carried out by a two-step process. For example, the surfaces of the ceramic powder can be coated with catalyst by first suspending the powder in an aqueous HCl solution of stannous chloride, recovering, washing and drying the powder, and then suspending the powder in an aqueous HCl solution of palladium chloride, recovering, washing and drying the powder. The resulting catalyzed powder is then ready to be electroless plated.

In the present invention electroless plating can be defined as the deposition of a continuous or at least a substantially continuous enveloping or encapsulating adherent coating of metal on ceramic particles dispersed in an aqueous plating bath or solution by the interaction of a salt of the metal and a reducing agent. By at least a substantially continuous encapsulating or enveloping coating of metal, it is meant herein that there is no significant exposure of the surface of the ceramic particle. The word "metal" herein includes metal alloy.

In the present invention, ceramic particles must be electroless plated since they must be completely enveloped by the metal coating, or at least substantially completely enveloped with the metal coating so that there is no significant exposure of the ceramic particle surface. Other plating or coating techniques do not involve suspension of a powder, such as the present fine ceramic powder, in a coating medium, and therefore, cannot produce the present metal enveloped ceramic particle in a useful amount within an economically practical time period.

The present electroless plating bath is comprised of an aqueous solution of a metal salt, a reducing agent, a chelating agent and a pH adjustor. Specifically, the bath contains ions of the metal which are reduced by the reducing agent under certain conditions determinable empirically such as, for example, certain pH and temperatures required for plating. Such plating baths are commercially available. Representative of the salts of nickel and copper which are useful are the nitrates, chlorides, acetates and sulfates. Representative of useful reducing agents are sodium hypophosphite and formaldehyde. Representative of useful pH adjustors are sodium hydroxide and hydrochloric acid. Representative of the chelating agents are sodium citrate and potassium sodium tartrate. The specific amount of each dissolved component in the bath depends largely on the rate of plating desired and is determinable empirically. In general, the rate of plating is decreased by decreasing the metal ion concentration of the solution, decreasing the pH, decreasing the temperature, and decreasing the amount of ceramic particles suspended in the plating bath.

The catalyzed ceramic particles are dispersed in the plating bath and kept in suspension therein until the enveloping or encapsulating metal coating is of the desired thickness suitable for fabricating the resulting metal-coated ceramic powder into the desired bubble pressure barrier. The ceramic particles can be kept in suspension by a number of techniques such as, for example, by stirring the bath or bubbling a gas therethrough which has no significant deleterious effect on the plating process. As a minimum, plating of the ceramic particles should be carried out to produce metal enveloped ceramic particles wherein the enveloping metal is at least substantially continuous and at least sufficiently thick so that they can be sintered together by the enveloping metal without significantly exposing the surface of the ceramic particle.

The present ceramic particles are electroless plated with a coating of a metal selected from the group consisting of nickel, copper, and alloys thereof. The preferred nickel copper alloys are composed of from 5 weight % to 95 weight % nickel balance copper, with the particularly preferred nickel copper alloy being composed of 83 weight % Ni balance copper.

The present anode composite can be produced by making the present bubble pressure barrier an integral part of a state-of-the-art anode or a variety of other electrodes useful as an anode in a molten carbonate fuel cell. Examples of the state-of-the-art anode are pororous sintered nickel or nickel 10 weight % chromium, as well as porous sintered anodes composed of copper or nickel copper alloys.

Particularly preferred as the present anode component are the porous sintered electrodes disclosed in the following copending applications which are assigned to the assignee hereof and which are incorporated herein by reference.

In copending application, Ser. No. 360,073, filed on Mar. 17, 1982 now U.S. Pat. No. 4,361,631 for Iacovangelo and Zarnoch, entitled ELECTRODE MATERIAL FOR MOLTEN CARBONATE FUEL CELL, there is disclosed a porous sintered electrode useful for a molten carbonate fuel cell composed of electroless plated metal encapsulated ceramic particles sintered together by the metal, said electrode having a pore volume greater than 40% by volume but less than 85% by volume of the electrode and a pore size ranging from about 0.1 micron to about 20 microns, said metal being copper or nickel, and said ceramic particles ranging in size from about 0.1 micron to about 100 microns and being selected from the group consisting of lithium aluminate, strontium titanate, α-alumina and mixtures thereof.

Copending application Ser. No. 371,896 filed on even date herewith for Iacovangelo and Zarnoch, entitled ALLOYED ELECTRODE STRUCTURE discloses substantially the same subject matter as that of Ser. No. 360,073, except that it discloses the electroless plating of the non-sintering ceramic powder with an enveloping coating of an alloy composed of about 5 weight % to about 95 weight % nickel balance copper, and such a NiCu alloy coated powder was found to form an unexpectedly well-sintered porous structure useful as an anode in a molten carbonate fuel cell.

The disclosed electrodes are useful as the anode or active electrode portion of the present anode composites. Also the disclosed electrode-forming particulate material is useful for forming the anode simultaneously with the present barrier producing the present anode composite.

The present anode composite can be produced by a number of sintering techniques. Preferably, the composite is sintered between plates, such as graphite plates, utilizing means on the supporting plate to maintain the desired size of the body of deposited powder. The top plates provides a minor but sufficient pressure, usually less than 1 psi, which prevents formation of voids, i.e. excessively large pores, during sintering. For example, the metal-enveloped ceramic powder can be deposited on a suitable substrate or plate, such as graphite in the size, shape, and thickness desired, and ordinarily, it is in the form of a layer. In one technique, a preformed anode, which is usually in the form of a plate or plaque, is placed on top of the barrier-forming layer forming a sandwich therewith, i.e. composite. Specifically, the entire contacting face of the anode should be covered by the barrier-forming layer. The resulting green composite is then sintered producing the present anode composite.

In a preferred embodiment, rather than using the preformed anode, a non-sintered anode-forming particulate body is used to produce the entire anode composite in situ. Specifically, a layer or layers of anode-forming powder is deposited on the barrier-forming layer in the size, shape, and thickness desired, and the resulting green composite is sintered to produce the present anode composite.

The present sintering is carried out at a temperature at least sufficient to sinter the contacting metal-enveloped ceramic particles to each other and to the contacting anode without exposing, or without significantly exposing, the surfaces of the ceramic particles. Generally, sintering temperature ranges from about 700° C. to about 1100° C., and preferably it is about 1000° C. A sintering temperature below about 700° C. will not produce the present sintered structure, whereas a temperature above about 1100° C. provides no significant advantage. Generally, sintering time ranges from about 15 minutes to about 3 hours.

The present sintering is carried out in an atmosphere in which the components are substantially inert, i.e. an atmosphere which has no significant deleterious effect on the resulting anode composite. Representative of such a sintering atmosphere is argon, hydrogen, mixtures thereof, and a vacuum. During sintering, the contacting metal-coated ceramic particles neck with each other by means of the metal coating and also with the contacting preformed anode, or anode-forming material which would sinter simultaneously, forming an integral structure, i.e. the present anode composite.

The present anode composite usually is in the form of a plate or plaque. It is comprised of a porous sintered anode which is usually in the form of a plate or plaque, and the porous sintered bubble pressure barrier, which also is usually in the form of a plate or plaque. In order for the present anode composite to function satisfactorily, the bubble pressure barrier is integrally sintered to one face of the anode and covers that anode face entirely.

In the present anode composite, the anode component or active electrode, has a pore volume greater than about 40% by volume but less than about 85% by volume of the anode component. Preferably, the anode component has a pore volume greater than about 50%, since the higher the surface area and pore volume of the anode component, the better is its performance. The specific pore volume and pore size or pore size distribution is determinable empirically and depends largely on the porosity of the matrix supporting the carbonate electrolyte as well as the operating conditions of the cell. For best results, the anode component should have a pore volume and pore size distribution which allow enough electrolyte to enter the anode component to accomplish reaction but not so much as to "flood" the anode component to the point where the reacting gas cannot diffuse rapidly to the reaction sites of the anode component. Small pores retain electrolyte in preference to large pores. Preferably, therefore, the anode component should have some percentage of pores which are smaller than the largest pores in the electrolyte matrix "tile" to retain electrolyte and a larger percentage of pores which are greater than pores in the tile so as to remain dry. Generally, the median pore size or diameter in the anode component ranges from about 1 micron to about 8 microns, and typically from about 2 microns to about 6 microns. Suitable surface areas are attained with an anode component ranging in thickness from about (100μ) to about (1500μ).

The size of the pores in the sintered bubble pressure barrier are critical. The barrier component of the composite must have a median pore size significantly smaller than the median pore size of the anode component. Specifically, the pores of the barrier must be sufficiently small so that they are filled, i.e. flooded, with electrolyte in order that electrolyte be maintained in the barrier. Generally, the median pore size or pore diameter in the barrier ranges from about 0.2μ to about 2μ, and typically, it ranges from about 0.5μ to about 1.5μ. The pores in the barrier can be as small as desired. In the present invention, the pores in the barrier remain the same size, or do not change significantly in size, within the life of the cell. Preferably, the median pore size of the barrier is larger than the median pore size of the matrix supporting the carbonate electrolyte.

The bubble pressure barrier has a pore volume greater than about 40% by volume but less than about 85% by volume of the barrier. The specific pore volume and pore size or pore size distribution is determinable empirically.

The present bubble pressure barrier can be as thin as desired. Generally, as a practical matter, the barrier has a minimum thickness of about $25\mu$. Also, it can be as thick as desired, for example, as thick as about $750\mu$. Typically, the thickness of the barrier ranges from about $125\mu$ to about $250\mu$. The present bubble pressure barrier does not change, or does not change significantly, in morphology during operation in a molten carbonate fuel cell.

The invention is further illustrated by the following examples:

EXAMPLE 1

In this example strontium titanate ($SrTiO_3$) particles having an average particle size of 0.2 micron were electroless plated with nickel and copper.

About 1000 ml of an aqueous solution composed of 10 grams/liter $SnCl_2$ and 40 ml/liter HCl was prepared for sensitizing the surfaces of the $SrTiO_3$ powder. About 100 grams of $SrTiO_3$ powder were suspended in the sensitizing solution by means of a magnetic stirring bar for 15 minutes at room temperature. The suspension was then filtered, washed with distilled water and dried in air at room temperature.

About 250 ml of an aqueous activating solution of 4 grams/liter $PdCl_2$ with a pH adjusted to pH 3 with HCl was used. The sensitized $SrTiO_3$ powder was suspended in the activating solution with a magnetic stirring bar at room temperature for about 15 minutes, then filtered, washed with distilled water and dried in air at room temperature producing catalyzed $SrTiO_3$ powder.

The nickel plating solution was prepared by dissolving 102 grams $Ni(OAc)_2.4H_2O$ in 250 ml distilled water to which 10 ml $NH_4OH$ was added producing a solution with a pH of $\simeq 7.8$. The solution was maintained at about 70° C. throughout plating.

Six grams of the sensitized activated $SrTiO_3$ powder was suspended in the 70° C. solution by means of a magnetic stirring bar and maintained in suspension throughout plating. The reducing agent, 40 ml $NH_2NH_2.H_2O$, was added to the suspension dropwise. Within a few minutes plating was initiated, i.e. visible reaction occurred as evidenced by the initially white-colored $SrTiO_3$ particles turning a gray color and by evolution of $H_2$ gas. Plating reaction was completed in approximately 30 minutes. Reaction completion was evidenced by the absence of $H_2$ gas bubbling in the solution and the reduction in the intensity of the green color of the nickel plating solution to near colorless. The nickel plated $SrTiO_3$ particles were filtered from the solution, washed with distilled water and dried in air at room temperature.

The nickel coated particles were free flowing, grey in color and contained elemental nickel in an amount of 80% by weight of the total weight of the nickel coated particles.

The copper plating solution was prepared by forming a solution of 6.3 grams $CuSO_4.5H_2O$, 500 ml distilled water, 3.1 grams $NaHCO_3$, 9.4 grams $C_4H_4O_6KNa.4H_2O$, and 6.3 grams NaOH. About 10 grams of the nickel-plated $SrTiO_3$ powder was dispersed in the resulting solution and was maintained in suspension by means of a magnetic stirrer. About 25 ml HC(O)H (37% solution), the reducing agent, was added to the suspension dropwise. All of the copper plating was carried out at about room temperature, i.e. about 25° C. Within a few minutes, the copper plating reaction occurred as evidenced by the evolution of gas. After about 15 minutes, the copper plating reaction was completed at which time the particles appeared coppery in color.

The solution was filtered and the recovered copper coated particles were washed with distilled water and dried in air.

The resulting metal-coated powder was free flowing and coppery in color. Its composition is given in Table I.

To carry out sintering, Grafoil ® sheet was positioned on the surface of a graphite plate to produce a cavity 4" square and 0.050" deep. The metal coated powder was deposited in the cavity substantially filling it producing a smooth layer about 0.050" thick. Grafoil ® (0.050" thick) sheet was placed on top of the deposited layer of powder and covered it substantially completely. A 5" square graphite plate was placed on top of the Grafoil ® covering it completely and pressure was applied to press the powder at room temperature under about 2500 psi. The applied pressure was then removed. A 2.5 kg steel plate was placed on top of the top graphite plate so that the body would shrink substantially only in thickness during sintering, and the resulting structure was then heated in an atmosphere comprised of 10% by volume hydrogen balance argon to a sintering temperature of 1000° C. After 12 hours at 1000° C., the power was shut off and the product was furnace cooled to room temperature. The resulting sintered barrier layer or plate was substantially uniform in structure.

Example 1 is illustrated in Table I.

The procedure used in the tabulated examples of Table I was substantially the same as that disclosed in Example 1 except as noted in the Table and as mentioned herein.

Specifically, in Examples 1–4 and 8–10, only the sintered plate, i.e. the bubble pressure barrier alone, was produced in order that it could be examined completely.

In Examples 5, 6 and 7, the present anode composite was produced utilizing a preformed sintered porous Ni-10 wt% Cr anode, about 4" square and about 0.03" thick.

In Examples 5, 6 and 7 the anode, which just fitted within the 4" square, was placed on top of the deposited layer of metal coated powder covering it completely, and the Grafoil ® was placed on top of the anode covering it substantially completely.

Example 11 was similar to Example 7 except that the entire anode composite was produced in situ by first depositing a layer of the barrier-forming powder on top of which was deposited the layer of metal coated powder for producing the anode component covering it completely, and the Grafoil ® was placed on top of the anode-forming layer covering it substantially completely.

In Table I the porosity given in % by volume and median pore size of the sintered product was determined by mercury intrusion porosimetry.

Also, in all of the Examples of Table I, sintering temperature was 1000° C. and sintering atmosphere was comprised of 10% by vol hydrogen balance argon.

TABLE I

| Example | Metal-Enveloped Ceramic Powder (weight %) | Ceramic Powder Avg Size ($\mu$) | Thickness of Unsintered Body ($\mu$) | Sintering Time (hrs) | Thickness of Sintered Body ($\mu$) | Sintered Product Porosity % by vol of Product | Sintered Product Barrier Median Pore Size ($\mu$) | Sintered Product Anode Median Pore Size ($\mu$) |
|---|---|---|---|---|---|---|---|---|
| 1 (A-65) | 69 Ni; 13.8 Cu; 17.2 SrTiO$_3$ | 0.2 | 1300 | 12 | 440 | 66 | 0.86 | — |
| 2 (A-70) | 40 Ni; 10 Cu; 50 SrTiO$_3$ | 0.2 | 1300 | 1 | 480 | 67 | 0.46 | — |
| 3 (A-74) | 10 Ni; 40 Cu; 50 SrTiO$_3$ | 0.2 | — | 3 | 380 | 62 | 0.47 | |
| 4 (A-75) | 40 Ni; 40 Cu; 20 SrTiO$_3$ | 2.0 | 3000 | 3 | 660 | 68 | 2.40 | |
| 5 (A-79) | 69 Ni; 13.8 Cu; 17.2 SrTiO$_3$ | 0.2 | 1000 (barrier layer) | 3 | 940 | 60 | 2.0 | 5.6 |
| 6 (A-85) | 40 Ni; 10 Cu; 50 SrTiO$_3$ | 0.2 | 1000 (barrier layer) | 3 | 1000 | 63 | 0.5 | 5.0 |
| 7 (A-84) | 15 Ni; 15 Cu; 70 SrTiO$_3$ | 0.2 | — | 3 | 910 | 56 | 0.3 | 6 |
| 8 (A-104) | 41.7 Ni; 8.3 Cu; 50 SrTiO$_3$ | 0.5 | 1000 | 38 | 330 | 60 | 0.8 | — |
| 9 (A-108) | 50 Ni; 10 Cu; 40 SrTiO$_3$ | 0.5 | 1000 | 1 | 430 | 65 | 1.1 | — |
| 10 (A-110) | 58.3 Ni; 11.7 Cu; 30 SrTiO$_3$ | 0.5 | 990 | 1 | 200 | 70 | 2.2 | — |
| 11 (A-116) | 50 Ni; 10 Cu; 40 SrTiO$_3$ (barrier-forming powder) | 0.5 | 990 | | | | | |
| | 41.7 Ni; 8.3 Cu; 50 SrTiO$_3$ (anode component-forming powder) | 5.0 | 2000 | 1 | 1300 | 65 | 1.5 | 6.3 |

Examples 1–11 of Table 1 illustrate the present invention.

Each of the sintered plates produced in Examples 1–4 and 8–10 was about 4" square and was substantially uniform in structure. Each sintered plate had sufficient strength for handling purposes.

Examination of sintered plates produced in substantially the same manner as set forth in Examples 1–4 and 8–10 by scanning electron microscopy did not show any exposure, or any significant exposure, of the surface of the SrTiO$_3$ powder. The sintered plates of Examples 1–4 and 8–10 would be useful as the bubble pressure barrier component in the present anode composite. Also, the sintered plate of Example 4 would be useful as the anode component of the present anode composite.

In each of Examples 5, 6 and 7, the present anode composite was produced. Each composite appeared to be strongly bonded, each had a substantially uniform structure, and each composite would be useful as an anode in a molten carbonate fuel cell.

Figure 2:
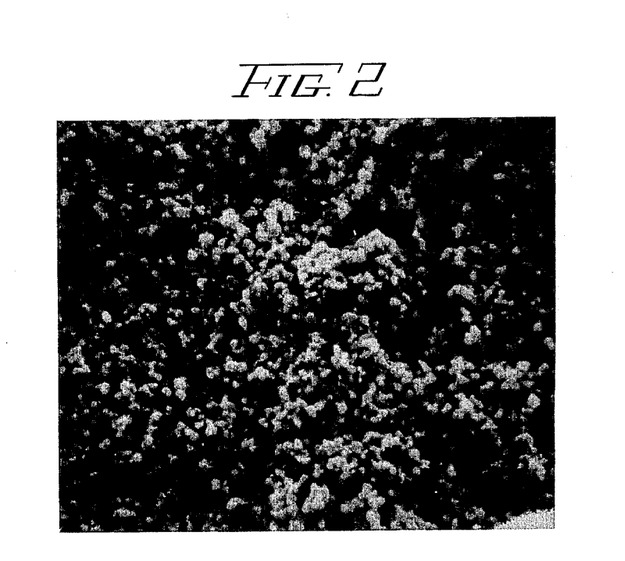
FIG. 2 is a scanning electron micrograph (magnified 2000$\times$) of the surface of the bubble pressure barrier component of the present anode composite.
Figure 3:
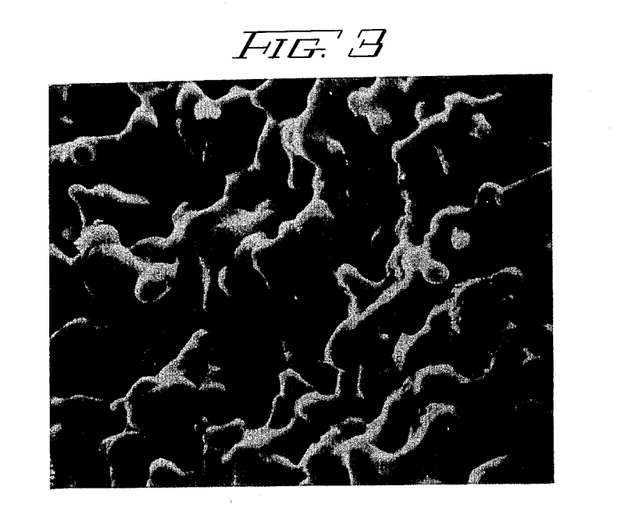
FIG. 3 is a scanning electron micrograph (magnified 2000$\times$) of the surface of the anode component, i.e. it is the surface opposite that of FIG. 2 of the same anode composite.

The anode composite produced in Example 6 is shown in FIGS. 2 and 3. The surface of the barrier side of the anode composite is shown in FIG. 2 and illustrates the substantially uniform small pores produced therein. A comparison of FIGS. 2 and 3 shows the significantly smaller pores present in the barrier component of the present anode composite.

Figure 4:
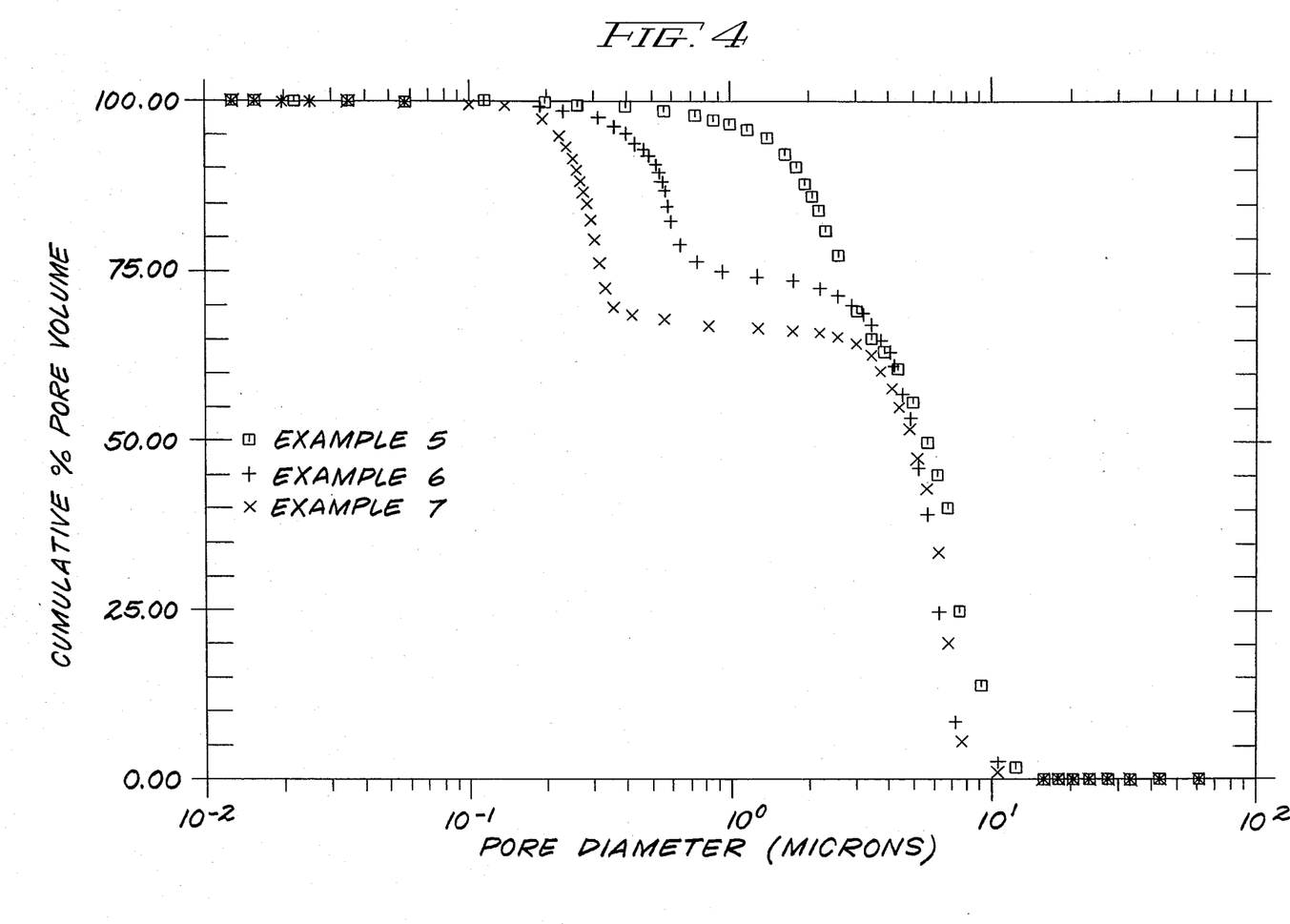
FIG. 4 illustrates on a semi-logarithmic scale the pore size distribution of each of three anode composites of the present invention.

Analysis by mercury intrusion porosymmetry of the anode composites of Examples 5, 6 and 7 is shown in FIG. 4. The lower portion of each curve in FIG. 5 was produced by the anode component, and the upper portion of each curve was produced by the bubble pressure barrier component. Specifically, FIG. 4 shows that in the barrier component, as the thickness of the enveloping metal decreased from 82.8 weight % in Example 5 to 30 weight % in Example 7, the average pore size was displaced toward smaller pores and a more narrow pore size distribution.

Figure 5:
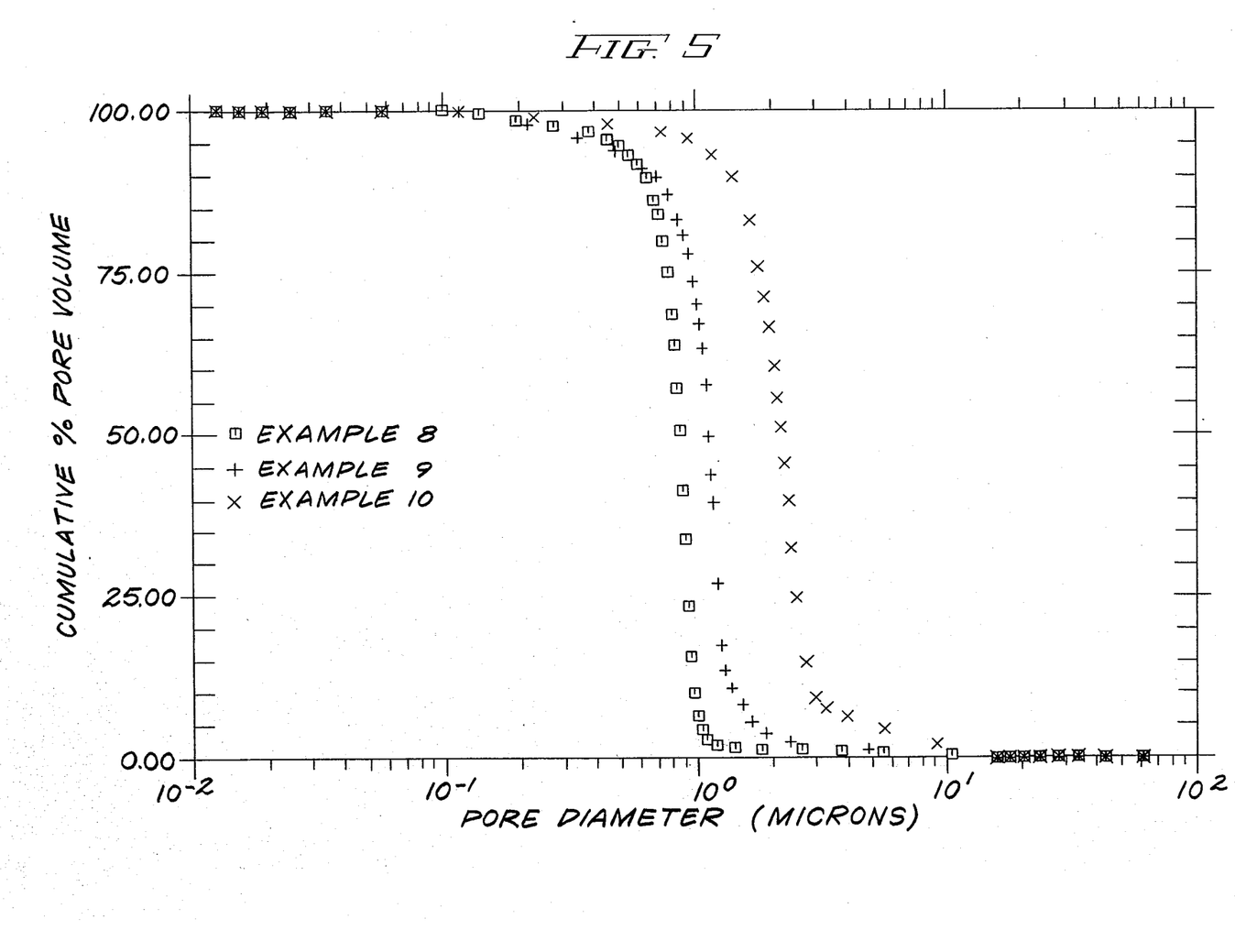
FIG. 5 illustrates on a semi-logarithmic scale the pore size distribution of each of three of the present bubble pressure components.

Analysis by mercury intrusion porosymmetry of each sintered plate of Examples 8, 9 and 10 is shown in FIG. 5. Specifically, FIG. 5 shows that as the thickness of the enveloping metal increases from 50 weight % in Example 8 to 70 weight % in Example 10, the average pore size is displaced toward larger pores and a broader pore size distribution.

The anode composite produced in Example 11 appeared to be strongly bonded and would be useful as an anode in a molten carbonate fuel cell. Analysis by scanning electron microscopy of an anode composite prepared in substantially the same manner as the anode composite of Example 11 showed that both sides of the composite did not show any exposure, or any significant exposure, of the surface of the SrTiO$_3$ particles.

EXAMPLE 12

Copper and nickel plated SrTiO$_3$ power prepared in substantially the same manner as set forth in Examples 1 and 11 were analyzed by scanning electron microscopy. The powder did not show any exposure, or any significant exposure, of the surface of the SrTiO$_3$ particles.

EXAMPLE 13

The anode composite produced in Example 5 was tested in an operating molten carbonate fuel cell. Specifically, the electrolyte structure was composed of 45% by weight LiAlO$_2$ and 55% by weight of a 62 mole % Li$_2$CO$_3$:38 mole % K$_2$CO$_3$ electrolyte.

The anode composite was placed on top of the electrolyte structure, coextensive therewith with the bubble pressure barrier component in contact with the electrolyte structure, and a standard state of the art cathode was positioned on the opposite side of the tile. The fuel gas feed to the anode compartment was composed of about 48% H$_2$, 32% CO$_2$ and 20% H$_2$O, and it was at a flow rate of about 300 cc/min to produce 75% utilization of H$_2$ at 18 amps. The fuel gas feed to the cathode component was composed of about 20% CO$_2$, 60% air and 20% H$_2$O, and it was at a flow rate to produce 50% utilization of O$_2$ at 18 amps. The cell was operated at a temperature of 650° C. and maintained at 650° C. for about 700 hours. At the end of this time the run was stopped due to operator error.

Figure 6:
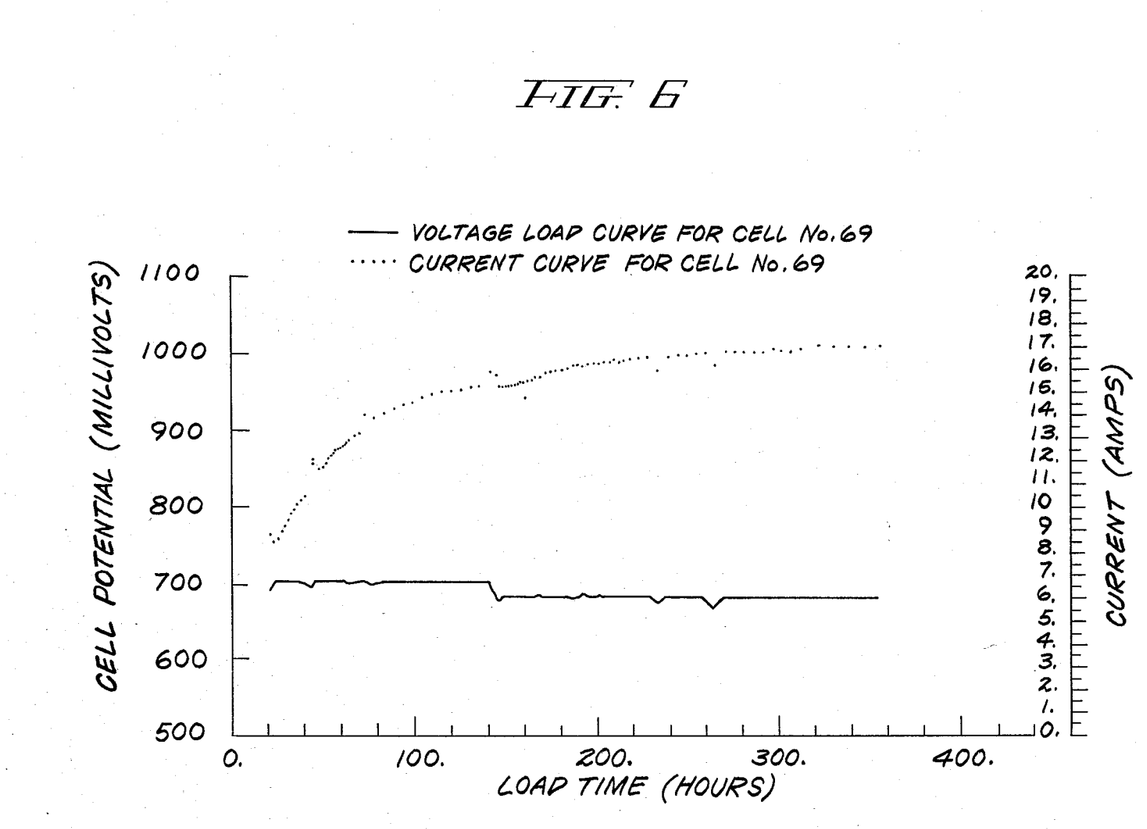
FIG. 6 shows graphs illustrating the operation of a molten carbonate fuel cell utilizing the present anode composite.

This example is illustrated in FIG. 6 which shows the satisfactory operation of the present anode composite.

What is claimed is:

1. An anode composite useful for a molten carbonate fuel cell comprised of a porous sintered anode composed of metal or metal-covered ceramic particles having a porous sintered bubble pressure barrier integrally sintered to one face thereof covering said face, said barrier being comprised of a plurality of metal-coated ceramic particles enveloped by said metal coating sintered together and to said anode by means of said metal coating, said metal coating being selected from the group consisting of nickel, copper and alloys thereof, said ceramic particles being selected from the group consisting of lithium aluminate, strontium titanate, α-alumina and mixtures thereof, said barrier having a pore volume greater than 40% by volume but less than 85% by volume of said barrier, the pores of said barrier having a median pore size significantly less than that of said anode.

2. The anode composite according to claim 1 wherein said anode is selected from the group consisting of nickel, copper, nickel copper alloys and alloys of nickel and about 10 weight % chromium.

3. An anode composite useful for a molten carbonate fuel cell comprised of a porous sintered anode comprised of metal covered ceramic particles sintered together by said metal covering wherein said metal is selected from the group consisting of nickel, copper and alloys thereof and said ceramic particles are selected from the group consisting of lithium aluminate, strontium titanate, α-alumina and mixtures thereof, said anode having a porous sintered bubble pressure barrier integrally sintered to one face thereof covering said face, said barrier layer being comprised of a plurality of metal coated ceramic particles enveloped by said metal coating sintered together by said metal coating, said metal coating being selected from the group consisting of nickel, copper and alloys thereof, said ceramic particles being selected from the group consisting of lithium aluminate, strontium titanate, α-alumina and mixtures thereof, said barrier layer having a pore volume greater than 40% by volume but less than 85% by volume of said barrier layer, the pores of said barrier layer having a median pore size significantly less than that of said anode.

4. The anode composite according to claim 3 wherein said metal covering said ceramic particles of said anode and said metal enveloping said ceramic particles in said barrier consists essentially of alloys composed of from about 5% by weight to 95% by weight nickel balance copper.

* * * * *